United States Patent
Zhou et al.

(10) Patent No.: US 7,054,656 B2
(45) Date of Patent: May 30, 2006

(54) METHOD AND APPARATUS FOR PROVISION OF NON-POWER CONTROL INFORMATION THROUGH A POWER CONTROL CHANNEL TO A MOBILE STATION

(75) Inventors: Frank Fei Zhou, Arlington Heights, IL (US); Jiangnan Jason Chen, Hawthorn Woods, IL (US); Fan Wang, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 392 days.

(21) Appl. No.: 10/211,609

(22) Filed: Aug. 2, 2002

(65) Prior Publication Data

US 2004/0023699 A1 Feb. 5, 2004

(51) Int. Cl.
*H04B 7/00* (2006.01)
*H04Q 7/20* (2006.01)

(52) U.S. Cl. .................. 455/522; 455/69; 455/13.4; 370/318; 370/320

(58) Field of Classification Search .............. 455/522, 455/13.4, 434, 515, 68, 69; 370/318, 320, 370/335, 342
See application file for complete search history.

(56) References Cited

U.S. PATENT DOCUMENTS

| 6,366,570 | B1* | 4/2002 | Bhagalia | 370/342 |
| 6,396,867 | B1* | 5/2002 | Tiedemann et al. | 375/141 |
| 6,611,508 | B1* | 8/2003 | Abe | 370/332 |
| 6,643,272 | B1* | 11/2003 | Moon et al. | 370/311 |

OTHER PUBLICATIONS

3GPP2-C50-20011203-039, "Method of Increasing the Number of Active/Virtually-Active Users", Nortel, Ericsson, pp. 1-3.

* cited by examiner

*Primary Examiner*—Edan Orgad
(74) *Attorney, Agent, or Firm*—Jeffrey K. Jacobs

(57) ABSTRACT

Using conventional techniques, a common power control channel provides information used by mobile stations for power control operation of each mobile station. In accordance with the present invention, the common power control channel is also used to provide information used by the mobile stations for purposes other than the power control operation of each mobile station. In one embodiment, the information used for purposes other than power control operation comprises information instruction the mobile station to transition to an active state. In another embodiment, the information used for non-power control purposes is transmitted to mobile stations during periods in which the power control information is not being transmitted. Using a common power control channel in this manner substantially reduces the resources consumed by a mobile station while operating in a stand-by state.

13 Claims, 2 Drawing Sheets

—PRIOR ART—

METHOD AND APPARATUS FOR PROVISION OF NON-POWER CONTROL INFORMATION THROUGH A POWER CONTROL CHANNEL TO A MOBILE STATION

TECHNICAL FIELD

The present invention relates generally to wireless communication systems and, in particular, to a technique for the provision of non-power control information through a power control channel to mobile stations in such wireless communication systems.

BACKGROUND OF THE INVENTION

Wireless communication systems are well known in the art. In such systems, wireless communications are typically supported by one or more fixed base stations that wirelessly communicate with one or more mobile stations. The type of information transmitted back and forth between the base stations and the mobile stations depends, in part, upon the particular type of wireless communication system in question. For example, in code division multiple access (CDMA) wireless communication systems, base stations transmit power control information to individual mobile stations via a so-called forward common power control channel (F-CPCCH). As known in the art of CDMA systems, the mobile stations used the power control information to continuously adjust the transmit power output by each mobile station.

Another feature of many wireless communication systems is the existence of multiple modes in which mobile stations may operate. In an active mode, mobile stations are transmitting and receiving data, as would be the case in normal use. At the opposite extreme, in a dormant mode, a mobile station does little more than monitoring an inbound link such as the forward paging channel. In some systems, a third mode, often referred to as a stand-by or control hold mode, exists as an interim state between an active and dormant mode. For example, in many current CDMA systems, a mobile station that is no longer in an active mode transitions to a stand-by mode for a short period of time before further transitioning back to the active mode or to a dormant mode. While in the stand-by mode, the mobile station must continually monitor for an instruction from a base station to transition to an active mode. In many current systems, this is achieved by the mobile station performing continuous monitoring of a dedicated control channel, or, worse yet, through the constant and multiple decoding of data provided on a forward packet data control channel. Regardless of which technique is used to listen for instructions from the base station, the mobile station continues to consume available battery power. As a result, battery life is shortened necessitating more frequent battery recharge operations. This wasteful consumption of battery resources is further exacerbated due to the use of explicit messaging that must be decoded by high-level applications running on the mobile station. Therefore, it would be advantageous to provide a technique whereby a mobile station may more efficiently receive information from a base station for non-power control purposes, e.g., such as instructions to a mobile station to transition from a stand-by mode to an active mode. Preferably, such a technique should minimize the use of scarce resources such as available battery power.

DETAILED DESCRIPTION OF THE PREFERRED EMBODIMENTS

The present invention provides a technique for providing non-power control information to mobile stations through a power control channel in wireless communication systems. Using conventional techniques, a common power control channel provides information used by mobile stations for power control operation of each mobile station. In accordance with the present invention, the common power control channel is also used to provide information used by the mobile stations for purposes other than the power control operation of each mobile station. In one embodiment of the present invention, the information used by the mobile station for purposes other than power control operation comprises information instructing the mobile station to transition to an active state. In another embodiment of the present invention, the information used for non-power control purposes is transmitted to mobile stations during periods in which the power control information is not being transmitted. Using a common power control channel in this manner substantially reduces the resources consumed by a mobile station while operating in a stand-by state. These and other advantages of the present invention may be more fully described with further reference to FIGS. 1–6 below.

Figure 1:
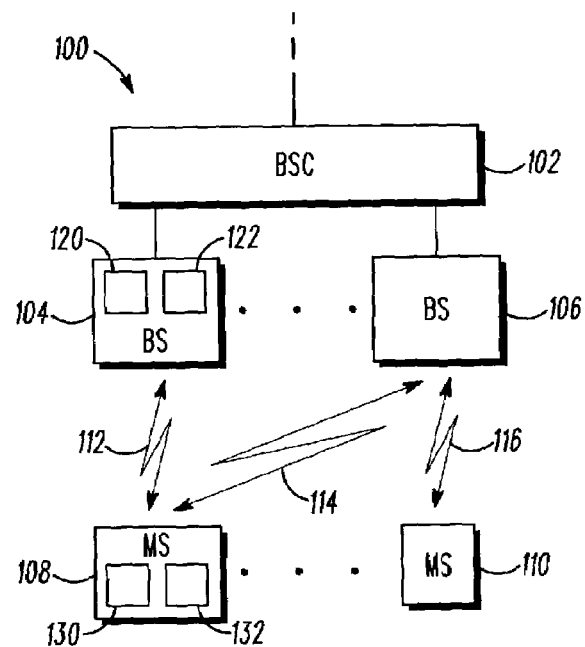
FIG. 1 is a block diagram of a wireless communication system in accordance with an embodiment of the present invention.

Referring now to FIG. 1, a wireless communication system 100 in accordance with the present invention is illustrated. The system 100 comprises a base site controller 102 coupled to one or more base stations 104, 106, which, in turn, are in wireless communication with one or more mobile stations 108, 110. Those having ordinary skill in the art will recognize that wireless communication systems, particularly CDMA systems, typically comprise substantially more infrastructure equipment than that shown in FIG. 1. However, for the sake of ease of illustration, only the relevant portions of a wireless communication system are illustrated.

As known in the art, the base stations 104, 106 comprise fixed wireless transmitters/receivers used to provide a broad coverage area within which mobile stations may operate. Operations of the base stations 104, 106 are coordinated by the base site controller 102, as known in the art. Although the present invention finds particular application to wireless CDMA systems, it is not necessarily limited in this regard. Nevertheless, the base stations 104, 106 may comprise CDMA-compliant base stations such as SuperCell 1xEV-DV base stations manufactured by Motorola, Inc. Each base station 104, 106 typically comprises a storage device 120 operably coupled to a processor 122. As known in the art, the storage device 120 may comprise any machine-readable medium such as read only memory (ROM), random access memory (RAM), hard drive, optical disk, floppy disk, or any other volatile or nonvolatile storage device or equivalents thereof. Likewise, the processor 122 may comprise a microprocessor, microcontroller, digital signal processor, graphics accelerator, combinations and/or equivalents thereof. In one embodiment of the present invention, operation of each base station is controlled in part using computer executable instructions stored in the storage device 120 for subsequent execution by the processor 122 in accordance with well-known programming techniques.

The base stations 104, 106 support wireless communications with one or more mobile stations 108, 110 via wireless resources 112, 114, 116. The various types of wireless resources 112, 114, 116 that may be used in accordance with the wireless communication system 100 are well known in the art and need not be described in further detail herein. As shown, each base station may support single or multiple wireless channels for use in communicating with single or multiple mobile stations, respectively. In one embodiment of the present invention, described in greater detail below, the wireless channels 112, 114, 116 support at least a common power control channel from the base stations 104, 106 to the mobile stations 108, 110, as well as a pilot channel from the mobile stations 108, 110 the base stations 104, 106, as would be found in a typical CDMA system. Suitable examples of mobile stations 108, 110 include CDMA2000 Release C mobile stations manufactured by Motorola, Inc. As further illustrated in FIG. 1, each mobile station, in one embodiment of the present invention, comprises a storage device 130 and processor 132 similar to those described above relative to the base stations 104, 106. Once again, the storage device 130 and processor 132 resident in each mobile station may be used to implement software-based processes used to control operation of the mobile stations in accordance with the present invention.

Figure 2:
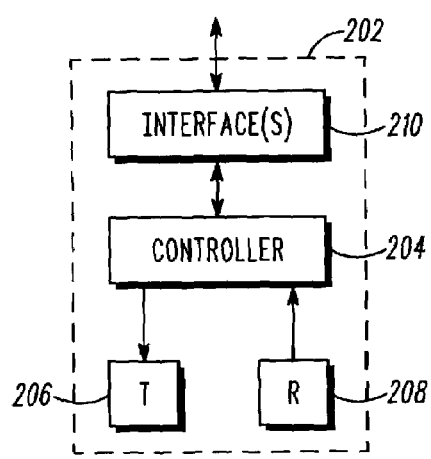
FIG. 2 is a block diagram illustrating a base station in accordance with an embodiment of the present invention in further detail.

Referring now to FIG. 2, a more detailed illustration of a base station 202 in accordance with the present invention is provided. In particular, the base station 202 comprises a controller 204 coupled to a transmitter 206, receiver 208 and one or more interfaces 210. The controller 204 controls the overall operation of the base station 202, and is typically implemented, in part, using a processor and storage device combination as described previously. The transmitter 206 may comprise any suitable wireless transmitter capable of modulating information onto a wireless carrier such as radio frequency (RF) channels. Likewise, the receiver 208 may comprise any suitable wireless receiver capable of demodulating the information from a wireless carrier. The one or more interfaces 210 provide connectivity between the base station 202 and other infrastructure devices, such as the base station controller illustrated in FIG. 1. In typical operation, the controller 204 oversees the flow of information from the interface(s) 210 to the transmitter 206 and from the receiver 208 to the interfaces 210. In some instances, the controller 204 operates as the source of information provided to the transmitter 206 or interface(s) 210, or as the sink of information provided by the receiver 208 or interface(s) 210. Those having ordinary skill in the art will recognize that the base station 202 may comprise a variety of peripheral elements (not shown) used to implement a variety of features commonly found in wireless communication systems.

Figure 3:
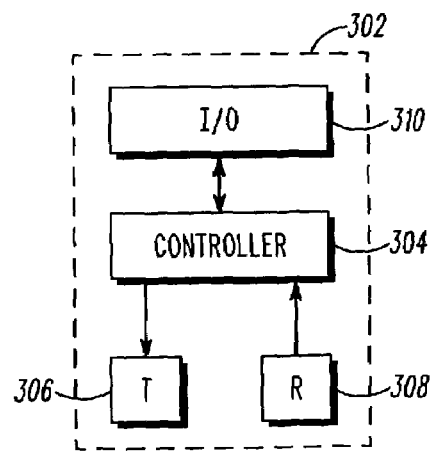
FIG. 3 is a block diagram illustrating a mobile station in accordance with an embodiment of the present invention in greater detail.

Referring now to FIG. 3, a mobile station 302 in accordance with the present invention is illustrated. Similar in construction to the base station 202 of FIG. 2, the mobile station 302 comprises a controller 304 coupled to a transmitter 306, receiver 308 and one or more input/output devices 310. The controller 304, which may be implemented using storage devices coupled to a suitable processor that executes stored instructions within the storage device, controls the overall operation of the mobile station 302. As in the case of the base station 202, the transmitter 306 and receiver 308 comprise wireless devices capable of modulating and de-modulating information to and from a wireless carrier, respectively. The input/output devices 310 may comprise any suitable means for providing information to, or receiving information from, a user of the mobile station 302. For example, the controller 304 may be coupled to a microphone, speaker, display, touch sensitive screen, a variety of buttons, or any other suitable device as known in the art. In typical operation, the controller 304 oversees the flow of information from the input devices 310 to the transmitter 306 and from the receiver 308 to the output devices 310. In some instances, the controller 304 operates as the source of information provided to the transmitter 306 or output devices 310, or as the sink of information provided by the receiver 308 or input devices 310. Finally, the mobile station 302 may comprise other peripheral devices not otherwise illustrated in FIG. 3.

Figure 4:
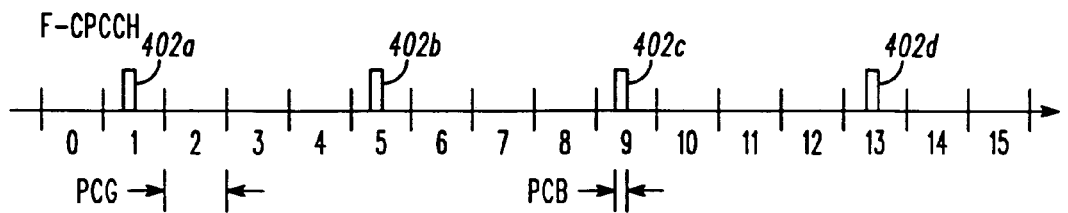
FIG. 4 is an exemplary timing diagram illustrating operation of a forward common power control channel and a reverse pilot channel in accordance with prior art techniques.
Figure 4:
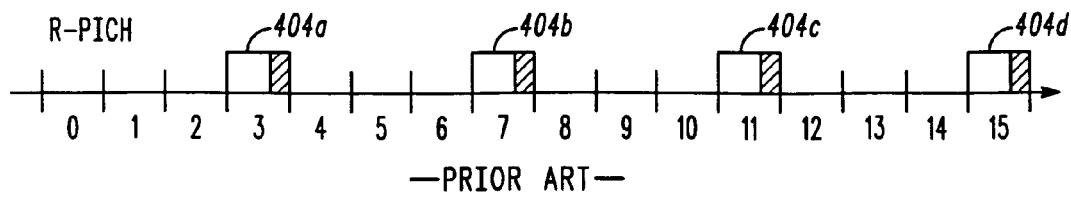
Figure 5:
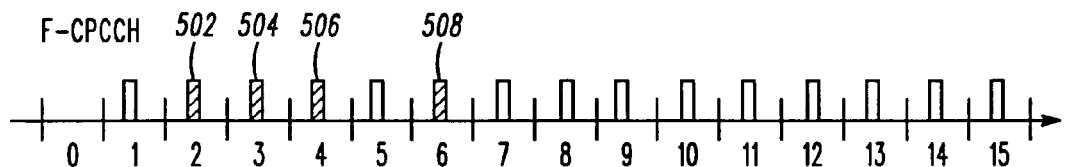
FIG. 5 is an exemplary timing diagram illustrating operation of a forward common power control channel and a reverse pilot channel in accordance with an embodiment of the present invention.
Figure 5:
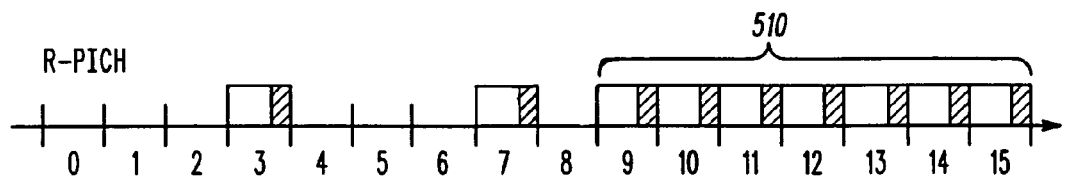

As previously described, the present invention exploits capacity on common power control channels currently available in wireless communication systems. These resources are further illustrated with reference to FIG. 4. In particular, FIG. 4 illustrates a forward common power control channel and a reverse pilot channel of the type typically found in current wireless CDMA systems. The progression of time is from left to right in FIG. 4. As is known in the art, the term "forward" denotes from the base stations to the mobile stations, and the term "reverse" denotes from the mobile stations to the base stations. In the embodiment illustrated in FIG. 4, the forward common power control channel is organized into sixteen (16) periodically repeating power control groups (PCG) each comprising a plurality of power control bits (PCB). In practice, each mobile station operating within the coverage area of the base station transmitting the forward common power control channel is assigned a single power control bit within each power control group. For example, in CDMA2000 compliant systems, the forward common power control channel comprises the sixteen (16) power control groups shown each having a duration of 1.25 milliseconds and each further comprising twenty four (24; twelve on an I channel and twelve on a Q channel) power control bits, each having a duration of a little more than 104 microseconds. During an active mode, the mobile station assigned to the forward common power control channel receives a single power control bit during each power control group. Likewise, during the active mode, the mobile station continuously transmits a so-called pilot signal on the reverse pilot channel in response to the continuously received power control bits. Each pilot signal transmitted on the reverse pilot channel reflects the previously received power control information received on the forward power control channel. FIG. 4, however, illustrates operation of the forward common power control channel and the reverse pilot channel during a stand-by mode. During such stand-by mode, certain power control groups on the reverse pilot channel, as well as the corresponding power control bits on the forward common power control channel are gated off as shown. In particular, FIG. 4 illustrates a gating rate of one-fourth in which only every fourth power control group is gated on. Thus, every fourth power control group, a power control bit 402 (only those corresponding to a single mobile station are shown) is transmitted and received on the forward common power control channel. In response, albeit after some processing delay, pilot signals 404 corresponding to respective ones of the power control bits 402 are sent on the reverse pilot channel every fourth power control group. In this manner, processing overhead at the mobile station is minimized in that the mobile station needs to monitor for power control bits and transmit pilot signals only every fourth power control group. As a result, however, a substantial amount of bandwidth goes unused in this scheme.

Recognizing the availability of this bandwidth, the present invention allows non-power control related information to be transmitted to mobile stations via the forward common power control channel. This is further illustrated in FIG. 5. As shown, non-power control related information 502–508 is transmitted during those periods in which the power control bits to the mobile station are otherwise gated off. In the example illustrated in FIG. 5, four non-power control related bits 502–508 are shown as being transmitted by the base station to the mobile station. In practice however, as little as a single bit may be transmitted depending on the nature of the non-power control information being transmitted, as well as other design constraints. In one embodiment of the present invention, the non-power control related information comprises information instructing the mobile station to transition from a stand-by state to an active state. In this case, the number of non-power control related bits sent to the mobile station is associated with the desired probability that the mobile station will correctly receive the information instructing it to transition to the active state. In one embodiment of the present invention, the mobile station comprises (in a receiver portion of the mobile station) an accumulator that monitors the forward common power control channel during those periods in which the power control bits are normally gated off. If, over a given period of time, the accumulator registers a cumulative amount of received energy greater than a given threshold, than the mobile station deems the instruction to transition to an active state as being affirmatively received and thereafter undertakes the necessary operations to transition to the active state. Once in the active state, the mobile station resumes full rate transmissions on the reverse pilot channel and continuously transmits pilot symbols 510 thereon and, on the common power control channel, power control bits are continuously sent as in normal operation. As noted previously, information instructing a mobile station to transition to an active state is but one example of non-power control information that may be transmitted via the forward common power control channel. However, when used in this manner, a mobile station may eliminate the need to continuously monitor a dedicated control channel and to continuously perform multiple decodings on a forward packet data control channel as required by the prior art when a base station initiated transition of a mobile station to an active state is carried out.

Figure 6:
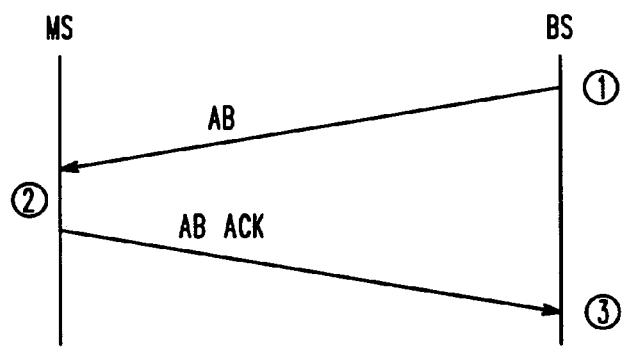
FIG. 6 is a schematic illustration of message flow between a base station and mobile station in accordance with an embodiment of the present invention.

The processing of the present invention is further illustrated with respect to FIG. 6. In particular, FIG. 6 illustrates messaging sent in accordance with the present invention between a base station and a mobile station. The progression of time is illustrated from top to bottom in FIG. 6. The process illustrated in FIG. 6 in which information is transmitted between the base and mobile stations is, in one embodiment of the present invention, implemented using software-based algorithms. For example, the respective controllers operating in the base and mobile stations may be implemented using suitably programmed processors executing stored instructions designed to carry out the operations illustrated in, and described below relative to, FIG. 6.

Various states or modes of the base station and mobile station are illustrated numerically. When operating in the state designated by reference numeral one, the base station either receives data to be sent to the mobile station (e.g., from the BSC or other source) or otherwise decides that the mobile station needs to transition to an active state. In response, the base station transmits one or more activation bits (AB) to the mobile station via the forward common power control channel. As previously described, the activation bits are but one example of a variety of non-power control information that could be sent in this manner. While in this first mode, the reverse pilot channel from the mobile station and the forward power control bits to the mobile station remain gated as previously described. Monitoring the forward power control channel, a mobile station receives the activation bits transmitted by the base station in addition to the power control bits. Upon successfully recognizing that it has received a sufficient number of activation bits, the mobile station enters an active mode. In the active mode, designated by reference numeral two, the mobile station begins transmitting at a full rate on the pilot channel and likewise begins monitoring a forward packet data control channel in anticipation of receiving the control information of the corresponding forward packet data channel (F-PDCH) to begin receiving data, via the F-PDCH, from the same base station. Other operations typically associated with an active mode may likewise be commenced by the mobile station. For example, the mobile station may begin transmitting channel quality indicator messages to the base station. Optionally, in response to detecting the activation bits, the mobile station may transmit an acknowledgement of receipt of the activation bits from the base station via a reverse acknowledgment channel. In one embodiment, in which the mobile station does transmit an acknowledgment back to the base station, the base station awaits receipt of the acknowledgement before entering a state designated by reference numeral three. In another embodiment, however, the base station does not wait to receive an acknowledgement prior to entering the state designated by reference numeral number three. Regardless, once the base station has entered this state, it discontinues gated operation of the forward common power control channel relative to the mobile station and begins transmitting at a full rate. Likewise, the base station also anticipates receiving full rate pilot information from the mobile station via the reverse pilot channel. In this manner, the present invention allows a base station to very efficiently cause a mobile station to transition from a stand-by state to an active state.

The present invention provides a technique whereby mobile stations may receive non-power control related information in a more efficient manner. By transmitting non-power control information via a common power control channel, the present invention substantially minimizes the amount of resources, particularly battery life, that would otherwise be consumed receiving such information. In this manner, according to one embodiment of the present invention, base station initiated transitions of mobile stations from a stand-by mode to an active mode may be more efficiently and quickly performed.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. In a wireless communication system comprising at least one base station in wireless communication with at least one mobile station, a method for a base station of the at least one base station to send information to a mobile station of the at least one mobile station, the method comprising:

transmitting during stand-by mode, via a common power control channel to the mobile station, information used by the mobile station for purposes other than power control operation of the mobile station, wherein transmitting the information used by the mobile station for purposes other than power control operation further comprises transmitting the information used by the mobile station for purposes other than power control operation during periods when the information used by the mobile station for power control operation is not transmitted.

2. The method of claim 1, further comprising:

receiving, from the mobile station, an acknowledgment of reception of the information used by the mobile station for purposes other than power control operation.

3. The method of claim 1, wherein the information used by the mobile station for purposes other than power control operation comprises information instructing the mobile station to transition to an active state.

4. In a wireless communication system of the type comprising at least one base station in wireless communication with at least one mobile station, a method for a mobile station of the at least one mobile station to receive information from a base station of the at least one base station, the method comprising:

receiving during stand-by mode, on a common power control channel from the base station, information used by the mobile station for purposes other than power control operation of the mobile station, wherein receiving the information used by the mobile station for purposes other than power control operation further comprises receiving the information used by the mobile station for purposes other than tower control operation during, periods when the information used by the mobile station for tower control operation is not received.

5. The method of claim 4, further comprising:

transmitting, to the base station, an acknowledgment of reception of the information used by the mobile station for purposes other than power control operation.

6. The method of claim 4, wherein the information used by the mobile station for purposes other than power control operation comprises information instructing the mobile station to transition to an active state.

7. A base station for use in a wireless communication system, wherein the base station wirelessly communicates with at least one mobile station, the base station comprising:

a wireless transmitter; and
    a controller, coupled to the wireless transmitter, that instructs the wireless transmitter to transmit during stand-by mode, via a common power control channel to a mobile station of the at least one mobile station, information used by the mobile station for purposes other than power control operation of the mobile station, wherein the instruction to transmit the information used by the mobile station for purposes other than power control operation further comprises an instruction to transmit the information used byte mobile station for purposes other than power control operation during periods when the information used by the mobile station for power control operation is not transmitted.

8. The base station of claim 7, wherein the information used by the mobile station for purposes other than power control operation of the mobile station comprises information instructing the mobile station to transition to an active state.

9. The base station of claim 7, wherein the common power control channel comprises periodically transmitted power control groups, and wherein the wireless transmitter transmits the information used by the mobile station for purposes other than power control operation as at least one bit forming a part of at least one power control group of the periodically transmitted power control groups.

10. The base station of claim 7, further comprising:

a wireless receiver, coupled to the controller, for receiving, from the mobile station, an acknowledgment of reception of the information used by the mobile station for purposes other than power control operation.

11. A mobile station for use in a wireless communication system, wherein the mobile station wirelessly communicates with at least one base station, the mobile station comprising:

a wireless receiver;
    a controller, coupled to the wireless receiver, that instruct the wireless receiver to receive during stand-by mode, via a common power control channel from a base station of the at least one base station, information used by the mobile station for purposes other than power control operation of the mobile station, wherein the instruction to receive the information used by the mobile station for purposes other than power control operation further comprises an instruction to receive the information used by the mobile station for purposes other than power control operation during periods when the information used by the mobile station for power control operation is not received.

12. The mobile station of claim 11, wherein the information used by the mobile station for purposes other than power control operation of the mobile station comprises information instructing the mobile station to transition to an active state.

13. The mobile station of claim 11, further comprising:

a transmitter, coupled to the controller, for transmitting, to the base station, an acknowledgment of reception of the information used by the mobile station for purposes other than power control operation.

* * * * *